(12) United States Patent
Chaumont et al.

(10) Patent No.: US 8,100,594 B2
(45) Date of Patent: Jan. 24, 2012

(54) DATA INPUT ARRANGEMENT WITH A SHAPED INTERFACE

(75) Inventors: Chad Chaumont, East Setauket, NY (US); Shane MacGregor, Forest Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 277 days.

(21) Appl. No.: 11/609,412

(22) Filed: Dec. 12, 2006

(65) Prior Publication Data
US 2008/0101840 A1    May 1, 2008

Related U.S. Application Data

(60) Provisional application No. 60/863,260, filed on Oct. 27, 2006.

(51) Int. Cl.
*B41J 5/08*    (2006.01)
*B41J 5/12*    (2006.01)

(52) U.S. Cl. ............ 400/472; 400/490; 341/22; 341/27; 345/168

(58) Field of Classification Search .................. None
See application file for complete search history.

(56) References Cited

U.S. PATENT DOCUMENTS

| | | | | |
|---|---|---|---|---|
| 1,468,566 | A * | 9/1923 | Hall | 400/483 |
| 3,929,216 | A * | 12/1975 | Einbinder | 400/484 |
| 4,332,493 | A * | 6/1982 | Einbinder | 400/484 |
| 4,597,681 | A * | 7/1986 | Hodges | 400/488 |
| 5,178,477 | A * | 1/1993 | Gambaro | 400/489 |
| 5,202,817 | A * | 4/1993 | Koenck et al. | 345/169 |
| 5,305,181 | A * | 4/1994 | Schultz | 345/168 |
| 5,406,063 | A * | 4/1995 | Jelen | 341/22 |
| 5,528,235 | A * | 6/1996 | Lin et al. | 341/22 |
| 5,598,469 | A * | 1/1997 | Preker | 379/433.07 |
| 5,774,384 | A * | 6/1998 | Okaya et al. | 345/169 |
| 6,172,620 | B1 * | 1/2001 | Brick et al. | 341/22 |
| 6,940,490 | B1 * | 9/2005 | Kim et al. | 345/168 |
| 7,182,533 | B1 * | 2/2007 | Caplan | 400/489 |
| 2002/0110238 | A1 * | 8/2002 | Kiernan | 379/433.07 |
| 2003/0213683 | A1 * | 11/2003 | Shimizu et al. | 200/341 |
| 2004/0196266 | A1 * | 10/2004 | Matsuura et al. | 345/169 |

* cited by examiner

*Primary Examiner* — Jill Culler

(57) ABSTRACT

A data input arrangement may include a first array of input keys defining a first shape extending across a first typing surface thereof; and a second array of input keys defining a second shape extending across a second typing surface thereof. The first and second arrays are contiguous with one another so that the first and second shapes create a non-linear surface extending across the data input arrangement. The non-linear surface enables users to tactilely locate individual keys of the first and second arrays.

14 Claims, 7 Drawing Sheets

DATA INPUT ARRANGEMENT WITH A SHAPED INTERFACE

PRIORITY CLAIM

This application claims the priority to the U.S. Provisional Application Ser. No. 60/863,260, entitled "Data Input Arrangement With a Key Pad Wave," filed Oct. 27, 2006. The specification of the above-identified application is incorporated herewith by reference.

FIELD OF THE INVENTION

The present invention relates generally to a data input arrangement with a shaped interface. Specifically, the shaped interface exhibits a non-flat (i.e., non-linear) surface.

BACKGROUND

Computing devices include a data input arrangement that allows a user to enter data. The data input arrangement may be a separate unit from the processing unit. For example, a keyboard connects to a computer tower. The input arrangement may also be part of a single unit. For example, hand held devices include a key pad on the housing. Conventional data input arrangements include keys with a corresponding data input. Furthermore, each key of the data input arrangement exhibits an identical shape. The shape may have a flat, concave, or convex face. However, the overall shape of the data input arrangement exhibits a substantially flat surface.

Data input arrangements may include indicia to identify a particular key. For example, on a conventional numeric key pad such as those found on telephones, a central key may include a circular protrusion (i.e., dot) such as the key to enter the data for the number "5." In another example, a conventional keyboard includes identical horizontal bars on the keys to enter the data for the letter "F" and "J." However, though these indicia may assist a user in locating a particular key, the user must always locate the indicia before proceeding. In addition, the use of gloves or other protection decreases the likelihood that the user will recognize the indicia.

SUMMARY OF THE INVENTION

A data input arrangement may include a first array of input keys defining a first shape extending across a first typing surface thereof; and a second array of input keys defining a second shape extending across a second typing surface thereof. The first and second arrays are contiguous with one another so that the first and second shapes create a non-linear surface extending across the data input arrangement. The non-linear surface enables users to tactilely locate individual keys of the first and second arrays.

DETAILED DESCRIPTION

Figure 1:
FIG. 1 shows a data input arrangement for a computing device according to an exemplary embodiment of the present invention.

The present invention may be further understood with reference to the following description and the appended drawings, wherein like elements are referred to with the same reference numerals. The present invention describes a data input arrangement for a computing device (e.g., personal computer, laptop, pager, mobile device, cell phone, radio frequency identification device, scanner, a data acquisition device, an imager, etc.). According to an exemplary embodiment of the present invention, the data input arrangement may exhibit a non-linear surface. The data input arrangement and the non-linear surface will be discussed in more detail below.

FIG. 1 shows a data input arrangement 500 for a computing device according to an exemplary embodiment of the present invention. Specifically, FIG. 1 illustrates the computing device as a mobile device. It should be noted that the use of a mobile device is only exemplary and, as discussed above, the data input arrangement 500 may be applied to any computing device utilizing a data input arrangement. In the following exemplary embodiments, the data input arrangement is described using a key pad (i.e., typing surface) for a mobile device, where the keys of the key pad are arranged in at least one array. However, the data input arrangement 500 may be any arrangement that utilizes one or more keys to input data such as a data-centric key pad, numeric key pad, keyboard, etc. It should be noted that the use of keys is only exemplary and the data input arrangement may utilize other data input means such as switches, light sensors, heat sensors, etc.

As shown in FIG. 1, the data input arrangement 500 consists of at least a numeric key pad 100. The numeric key pad 100 is housed in a housing 501. The numeric key pad 100 may include a plurality of keys (e.g., twelve keys) which may be divided into a plurality of rows and columns (i.e., arrays) (e.g., three columns and four rows). For example, as shown in FIG. 1, from left to right, a first row (top) may include the numbers "1", "2", and "3"; a second row may include the numbers "4", "5", and "6"; a third row may include the numbers "7", "8", and "9"; and a fourth row (bottom) may include "*", "0", and "#". It should be noted that the use of rows and columns is only exemplary and the data input arrangement may exist in staggered form, diagonal lines, etc.

Figure 2:
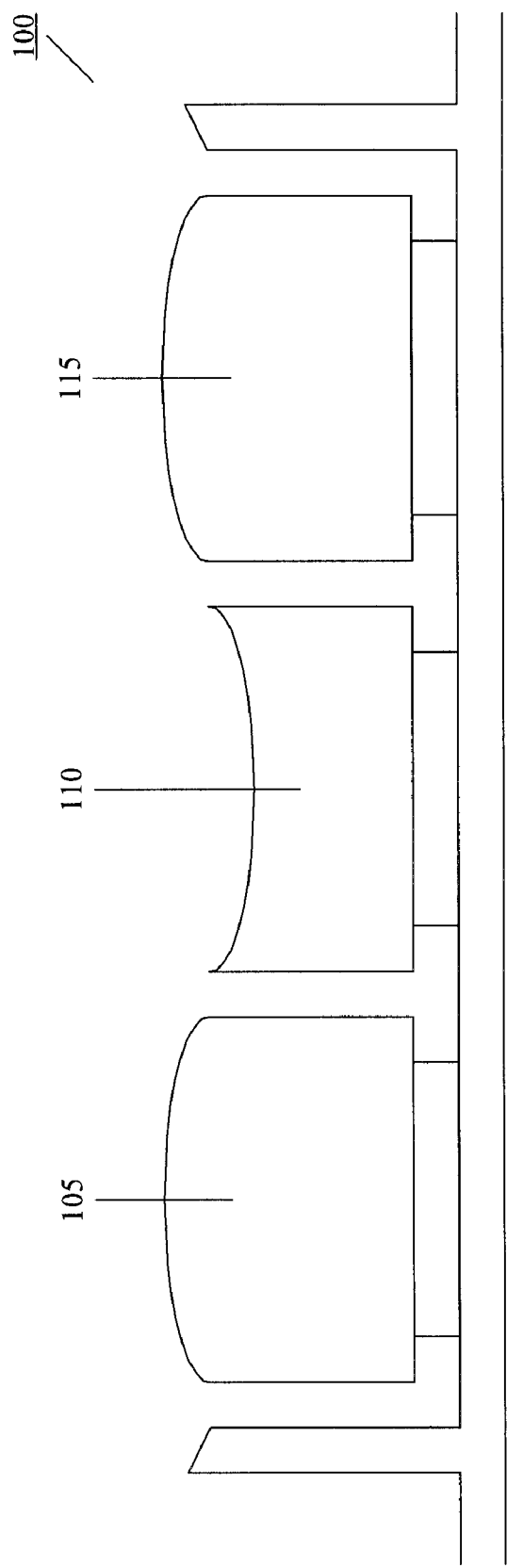
FIG. 2 shows a cross sectional view for a first exemplary embodiment including a wave shape in a row of the data input arrangement of FIG. 1.

FIG. 2 shows a cross sectional view for a first exemplary embodiment of a row of the data input arrangement 500 of FIG. 1. As shown in FIG. 2, the numeric key pad 100 incorporates a shaped interface that spans across at least one row of the numeric key pad 100. Specifically, the shaped interface exhibits a wave shape. The wave shape is created by arranging the three columns contiguously with one another. In the exemplary embodiment shown in FIG. 2, the wave shape is horizontal extending across a lateral surface of the numeric key pad 100. That is, the wave shape exhibits two crests (i.e., concave shape) and one trough (i.e., convex shape). The two crests exist on the first and third columns, where the first column is the leftmost. The trough exists between the two crests in the second column. For example, the key 105 is a key in the first column and thus exhibits a crest of the wave shape. The key 110 is a key in the second column and thus exhibits a trough of the wave shape. The key 115 is a key in the third column and thus exhibits a crest of the wave shape. In addition, the wave shape maintains a common amplitude for each row of the numeric key pad 100, as shown in FIG. 1. It should be noted that this wave shape may exist on a single row or may exist in multiple rows for the data input arrangement 500.

Figure 3:
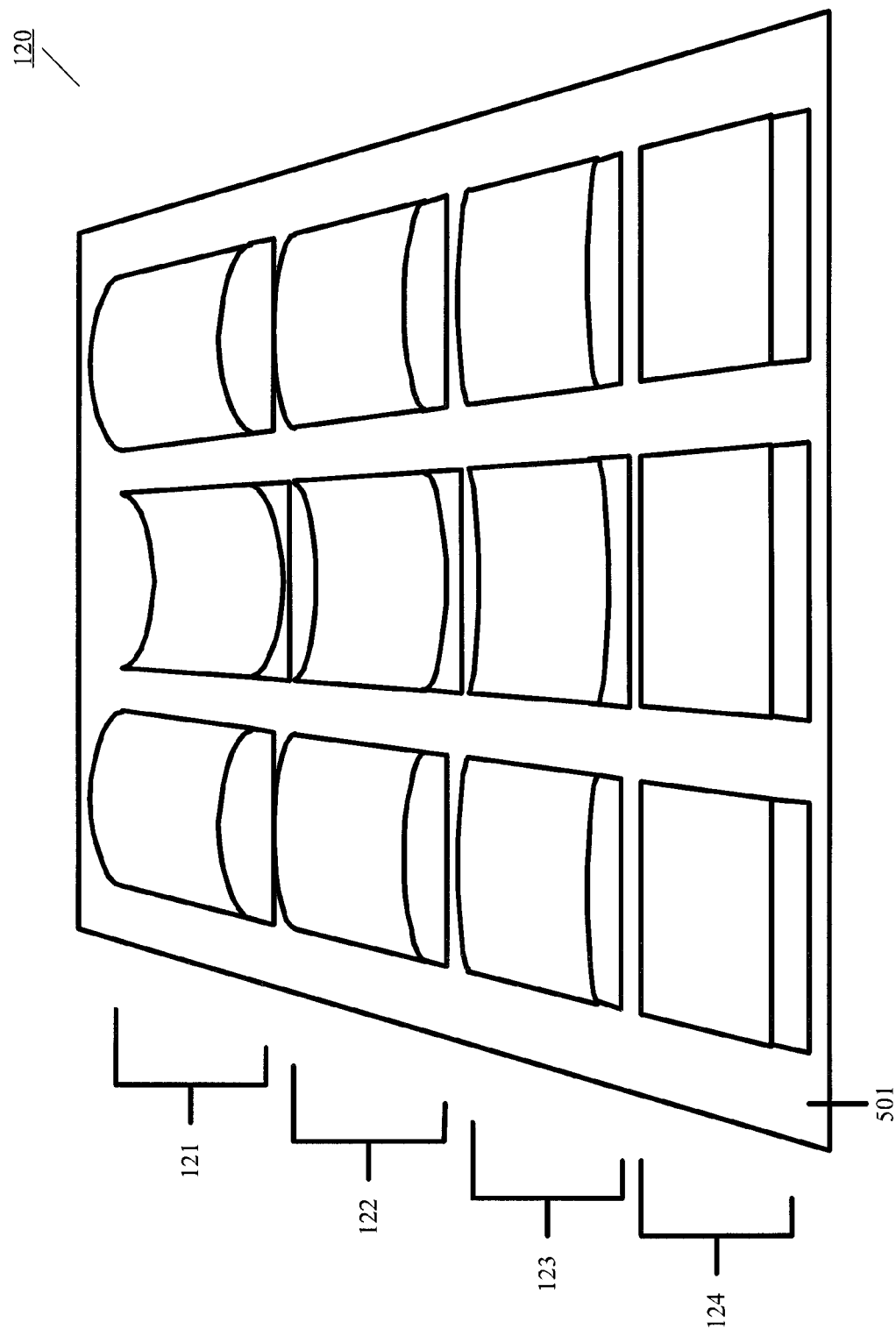
FIG. 3 shows a perspective view for a second exemplary embodiment including a wave shape of the data input arrangement of FIG. 1.

It should also be noted that the first exemplary embodiment shown in FIGS. 1-2 is only exemplary and the wave shape of the numeric key pad 100 may be altered in a plurality of embodiments. For example, the wave shape may exhibit varying amplitudes across the columns of the numeric key pad 100, as shown in FIG. 3. FIG. 3 shows a perspective view for a second exemplary embodiment 120 of the data input arrangement 500 of FIG. 1. In the second exemplary embodiment 120, the amplitude may gradually decrease going down the rows. As shown, row 121 has the largest amplitude laterally spanning across the numeric key pad 100. Row 122 has a lower amplitude than row 121 that laterally spans across the numeric key pad 100. Row 123 has an even lower amplitude than row 122 that laterally spans across the numeric key pad 100. Finally, row 124 has the lowest amplitude that laterally spans across the numeric key pad 100. The amplitude of row 124 may be low enough to substantially create a flat wave (i.e., linear). It should be noted that the amplitudes decreasing going down the rows is only exemplary and the amplitudes may also increase going down the rows.

Figure 4:
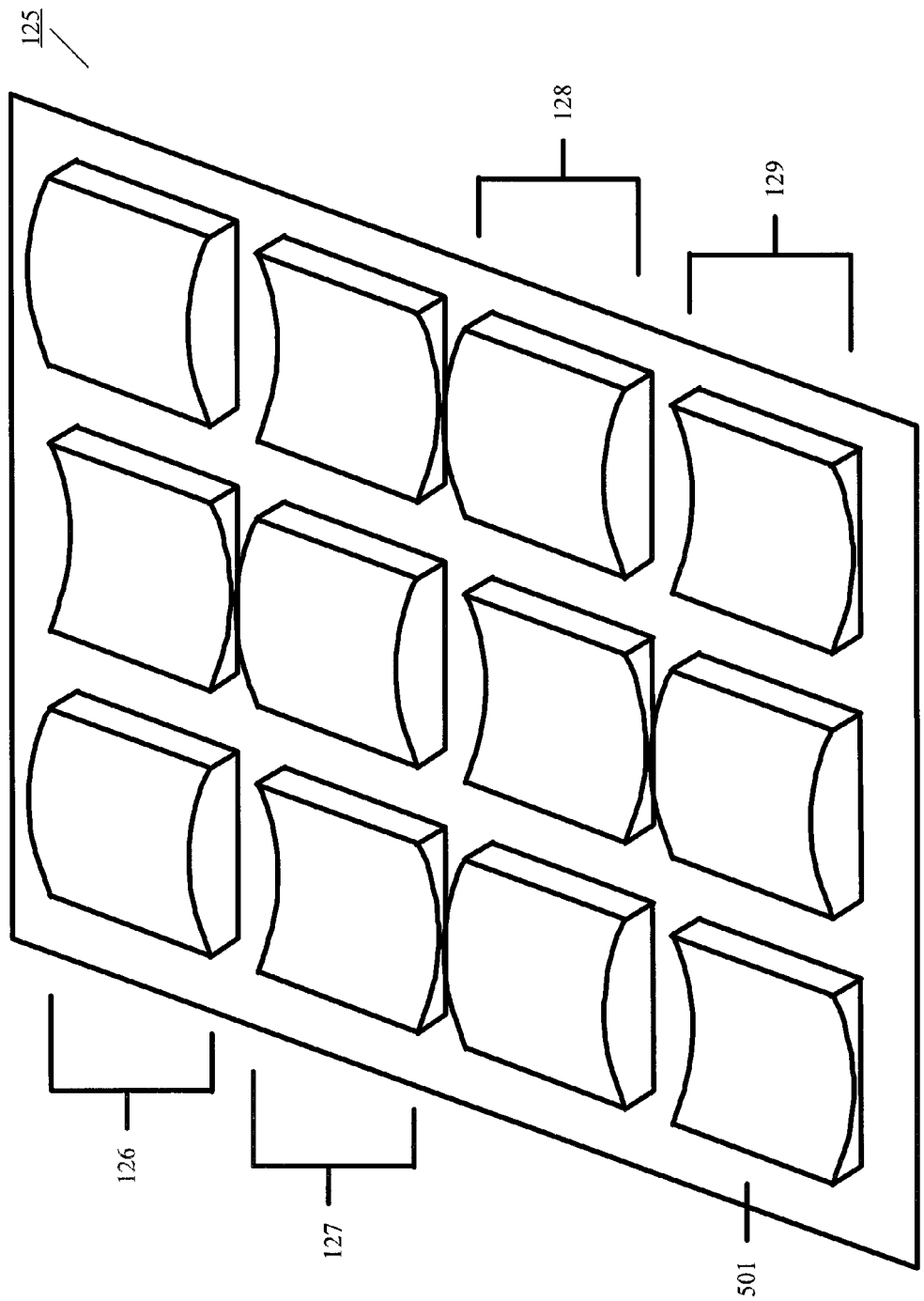
FIG. 4 shows a perspective view for a third exemplary embodiment including a wave shape of the data input arrangement of FIG. 1.

In another example, the wave shape may exhibit wave shapes that alternate going down the rows, as shown in FIG. 4. FIG. 4 shows a perspective view for a third exemplary embodiment 125 of the data input arrangement 500 of FIG. 1. In the third exemplary embodiment 125, two different wave shapes exist. The first wave type is similar to the wave shape described above with reference to FIGS. 1-2. That is, the first wave type has two crests (going down columns 1 and 3) and one trough (going down column 2). The second wave type is a horizontal reflection of the wave shape described above with reference to FIGS. 1-2. That is, the second wave type has two troughs (going down columns 1 and 3) and one crest (going down column 2). The first wave type exists in rows 126 and 128. The second wave type exists in rows 127 and 129. In the exemplary embodiment, the amplitudes of the first wave type and the second wave type are identical. However, it should be noted that the third exemplary embodiment may also incorporate the features of the previously described exemplary embodiments. For example, the wave shapes of FIG. 4 may exhibit a decreasing or increasing amplitude going down the rows 126-129. In addition, it should be noted that the use of the first wave type (two crests, one trough) in the initial row is only exemplary and the initial row may exhibit the second wave type (two troughs, one crest).

Figure 5:
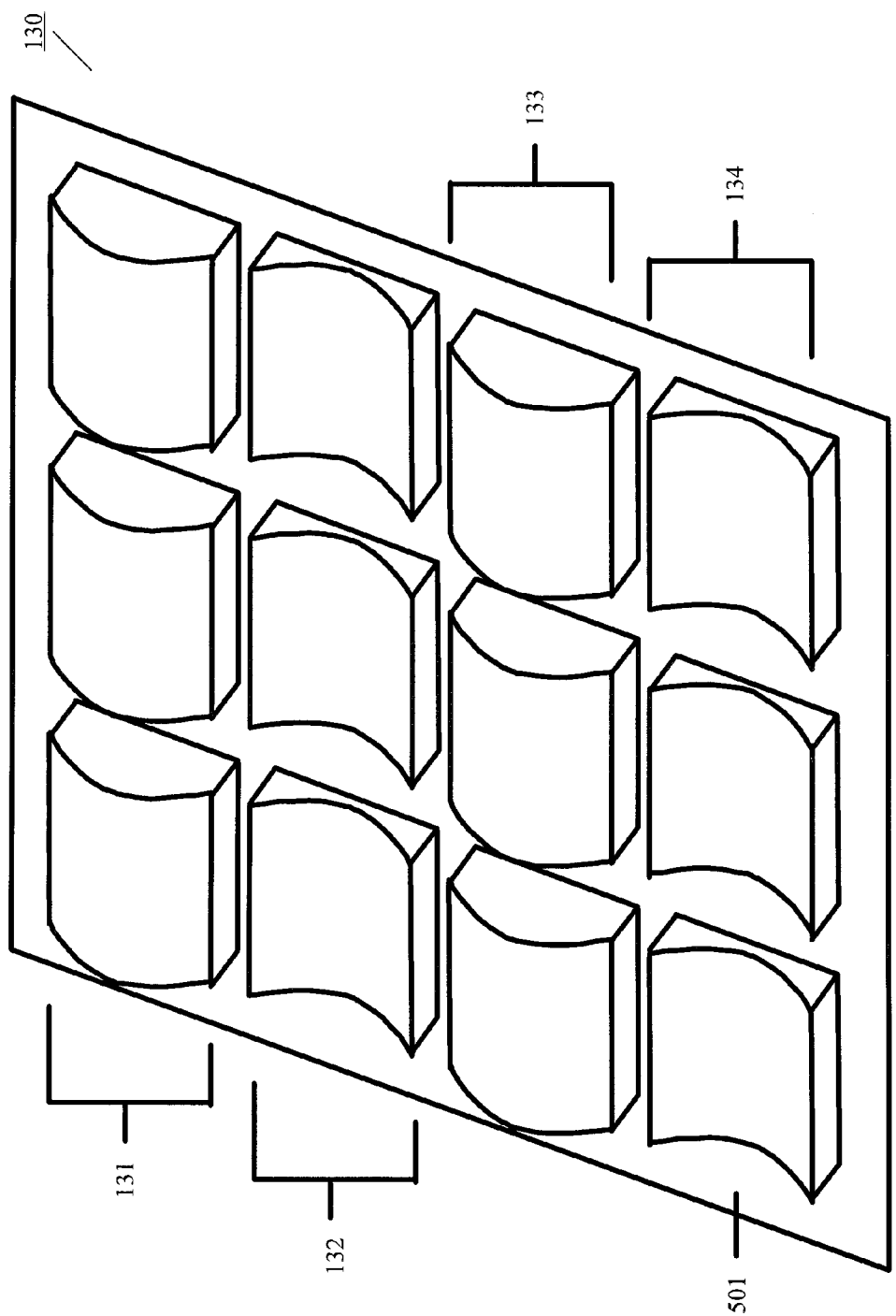
FIG. 5 shows a perspective view for a fourth exemplary embodiment including a wave shape of the data input arrangement of FIG. 1.

In yet another example, the wave shape may span across a longitudinal surface of the numeric key pad 100, as shown in FIG. 5. FIG. 5 shows a perspective view for a fourth exemplary embodiment 130 of the data input arrangement 500 of FIG. 1. In the fourth exemplary embodiment 130, the wave shape may exhibit the same properties as the wave shape described above with reference to FIGS. 1-2. However, the wave shape of the first exemplary embodiment extends across the lateral surface of the numeric key pad 100 while the fourth exemplary embodiment 130 extends across the longitudinal surface. The wave shape of the fourth exemplary embodiment 130 includes two crests and two troughs. As illustrated, the two crests exist in rows 131 and 133. The two troughs exist in rows 132 and 134. A common amplitude is maintained for the wave shapes in the fourth exemplary embodiment. However, it should be noted that the fourth exemplary embodiment 130 may also incorporate the features of the previous described exemplary embodiments. For example, the wave shapes of FIG. 5 may exhibit a decreasing or increasing amplitude going across the columns that include the rows 131-134. In addition, the alternating wave shapes for the third exemplary embodiment 125 of FIG. 4 may also be incorporated.

Figure 6:
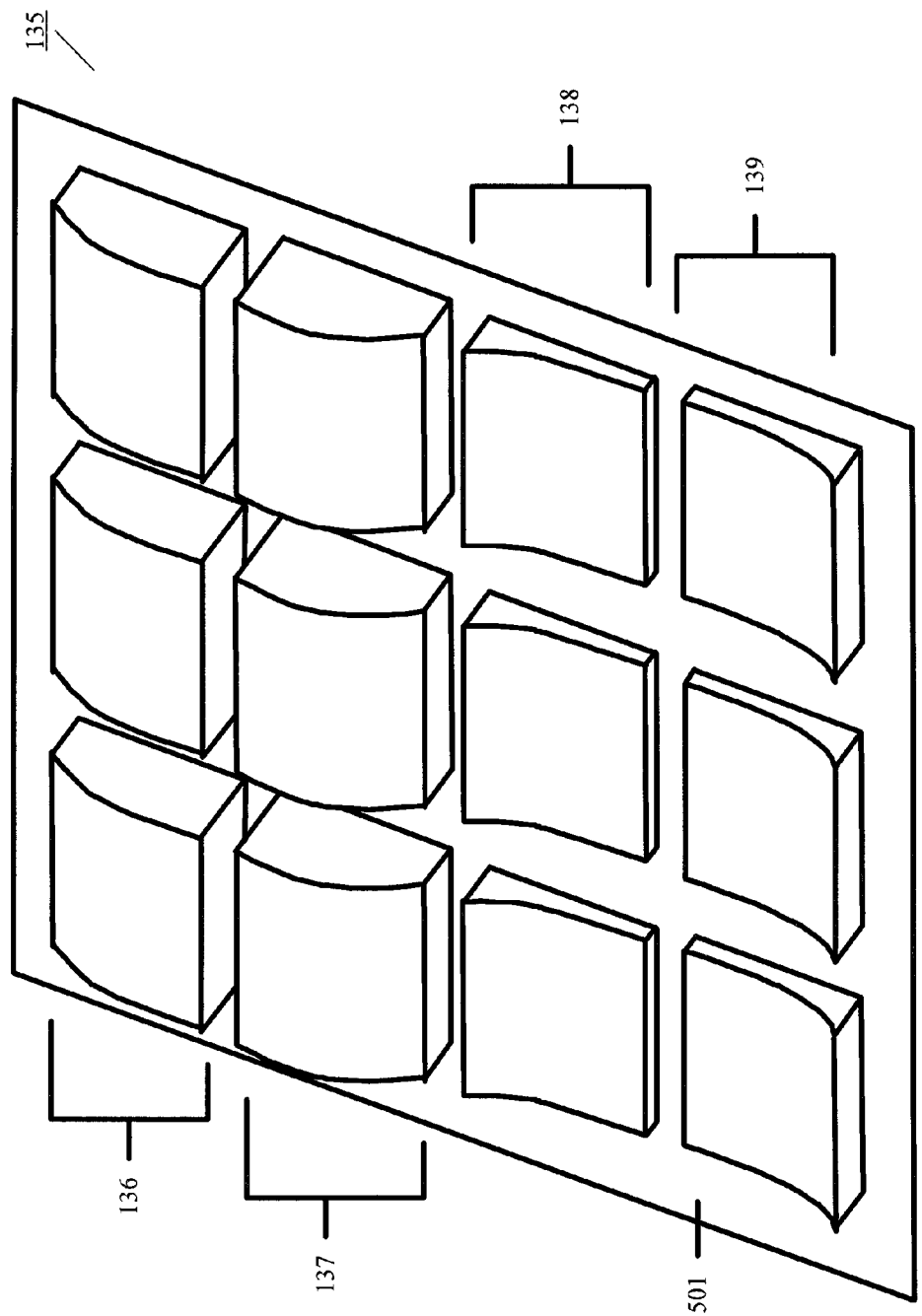
FIG. 6 shows a perspective view for a fifth exemplary embodiment including a wave shape of the data input arrangement of FIG. 1.

In yet another example, the wave shape may span across a single period of the wave as it extends across the longitudinal surface of the numeric key pad 100, as shown in FIG. 6. FIG. 6 shows a perspective view for a fifth exemplary embodiment 135 of the data input arrangement 500 of FIG. 1. In the fifth exemplary embodiment 135, the wave shape may exhibit the same properties as the wave shape described above with reference to FIG. 5. However, the wave shape of the fourth exemplary embodiment 130 includes two periods of the wave extending across the longitudinal surface of the numeric key pad 100. Such an embodiment allows each key of the numeric key pad 100 to exhibit half a period of the wave shape.

In the fifth exemplary embodiment 135, each key of the numeric key pad 100 exhibits a quarter period of the wave shape. That is, a single period of the wave shape is extended across the longitudinal length of the numeric key pad 100. As illustrated, row 136 includes the first quarter (increasing half of the crest) of the period of the wave shape. Row 137 includes the second quarter (decreasing half of the crest) of the period of the wave shape. Row 138 includes the third quarter (decreasing half of the trough) of the period of the wave shape. And row 139 includes the fourth quarter (increasing half of the trough) of the period of the wave shape.

A common amplitude is maintained for the wave shapes in the fifth exemplary embodiment. However, it should be noted that the fifth exemplary embodiment may also incorporate the features of the previous described exemplary embodiments. For example, the wave shapes of FIG. 6 may exhibit a decreasing or increasing amplitude going across the columns that include the rows 136-139. In addition, the alternating wave shapes illustrated in FIG. 4 may be incorporated. It should be noted that the use of a single period is only exemplary. The numeric key pad 100 may incorporate any portion or number of periods. For example, the wave shape may decrease the size of the period (increase frequency) and include more than two waves in the wave shape. In another example, the wave shape may further stretch (decrease frequency), thereby increasing the period. If the numeric key pad 100 only included ¼ of the wave shape, then all keys would exhibit the increasing portion of a crest or decreasing portion of a trough. In a similar manner, the ¼ of the wave shape may apply to any portion of a single period of the wave shape.

It should be noted that the exemplary embodiments described above are only exemplary and that the features of the exemplary embodiments may stand alone (as illustrated in FIGS. 1-6) or may be mixed to include more than a single feature. It should also be noted that there are other embodiments that may include the wave shape for the data input arrangement 500. For example, the wave shape may extend diagonally (e.g., from top left to bottom right, from top right to bottom left, etc.) across the data input arrangement 500. In another example, the wave shape may extend in both diagonals across the data input arrangement 500 to form an X-shaped wave. In yet another example, the wave shape may extend as a combination of at least lateral, longitudinal, and diagonal directions. For example, if the wave shape extends in both diagonals for a first half of the data input arrangement 500 and another wave shape extends laterally in the other half, a substantially Y-shaped wave may exist. Other wave shapes include V-shaped waves, O-shaped waves, etc. and their horizontal/vertical reflections.

Furthermore, the data input arrangement may include an interface that exhibits substantially similar properties achieved by using the wave shape. For example, the keys may taper to a point instead of rounding off and thereby create an angled shape. Similar to the wave shape, the angled shape may also be designed in a variety of manners.

Figure 7A:
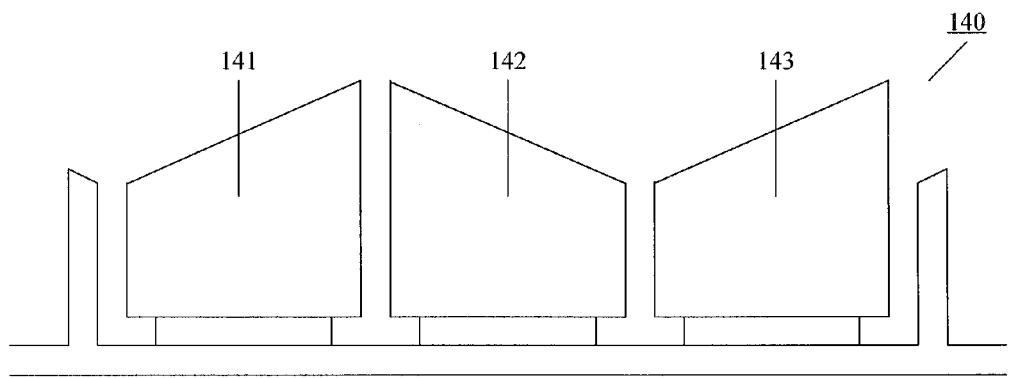
FIG. 7a shows a cross sectional view for a sixth exemplary embodiment including an angled shape in a row of the data input arrangement of FIG. 1.

FIG. 7a shows a cross sectional view 140 for a sixth exemplary embodiment including an angled shape in a row of the data input arrangement of FIG. 1. As shown in FIG. 7a, the numeric key pad 100 incorporates an angled shape that spans across at least one row of the numeric key pad 100. In the exemplary embodiment shown in FIG. 7a, the angled shape is horizontal extending across a lateral surface of the numeric key pad 100. That is, the wave shape exhibits two increasing slants (i.e., positive slope) and one decreasing slant (i.e., negative slope). The two increasing slants exist on the first and third columns, where the first column is the leftmost. The decreasing slant exists between the two increasing slants in the second column. For example, the key 141 is a key in the first column and thus exhibits an increasing slant of the angled shape. The key 142 is a key in the second column and thus exhibits a decreasing slant of the angled shape. The key 143 is a key in the third column and thus exhibits an increasing slant of the angled shape. In addition, the angled shape maintains a slope for each row of the numeric key pad 100 that exhibits an identical absolute value. However, the use of the identical absolute value slope is only exemplary and the slopes of the slants may alter. It should be noted that this angled shape may exist on a single row or may exist in multiple rows for the data input arrangement 500. It should also be noted that this angled shape may be vertically reflected. That is, the keys 141, 143 may exhibit the decreasing slope while the key 142 may exhibit the increasing slope.

Figure 7B:
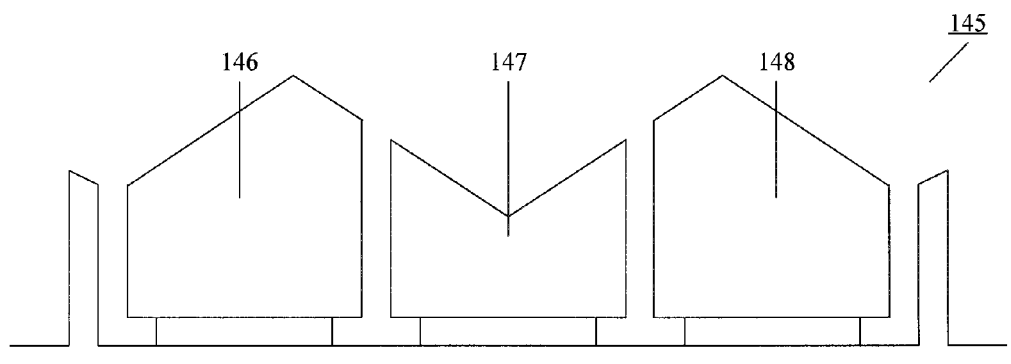
FIG. 7b shows a cross sectional view for a seventh exemplary embodiment including an angled shape in a row of the data input arrangement of FIG. 1.

FIG. 7b shows a cross sectional view 145 for a seventh exemplary embodiment including an angled shape in a row of the data input arrangement of FIG. 1. As shown in FIG. 7b, the numeric key pad 100 incorporates an angled shape that spans across at least one row of the numeric key pad 100. In the exemplary embodiment shown in FIG. 7b, the angled shape is horizontal extending across a lateral surface of the numeric key pad 100. That is, the wave shape exhibits two peaks and one valley. The two peaks exist on the first and third columns, where the first column is the leftmost. The valley exists between the two peaks in the second column. For example, the key 146 is a key in the first column and thus exhibits a peak of the angled shape. The key 147 is a key in the second column and thus exhibits a valley of the angled shape. The key 148 is a key in the third column and thus exhibits a peak of the angled shape. The peaks for the cross sectional view 145 is shown as being situated away from a midpoint of the key. However, the peak may be directly over the midpoint of the key. In contrast, the valley is shows as being directly above the midpoint of the key. However, the valley may be situated away from the midpoint. In addition, the angled shape maintains a first value for slope toward a peak (i.e., away from valley) and a second value for slope toward a valley (i.e., away from peak). Similar to the slopes exhibited in the slants of the cross sectional view 140 of FIG. 7a, the use of the identical absolute value slope is only exemplary and the slopes of the slants may alter. Furthermore, it should again be noted that this angled shape may exist on a single row or may exist in multiple rows for the data input arrangement 500.

Figure 7C:
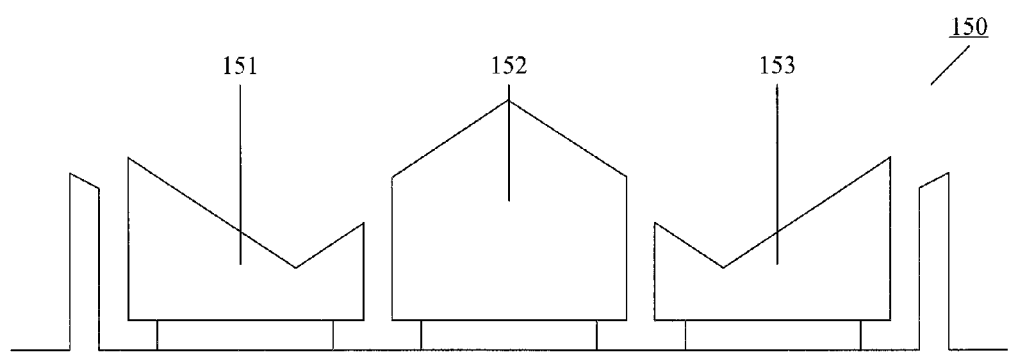
FIG. 7c shows a cross sectional view for an eighth exemplary embodiment including an angled shape in a row of the data input arrangement of FIG. 1.

FIG. 7c shows a cross sectional view 150 for an eighth exemplary embodiment including an angled shape in a row of the data input arrangement of FIG. 1. As shown in FIG. 7c, the numeric key pad 100 incorporates an angled shape that spans across at least one row of the numeric key pad 100. In the exemplary embodiment shown in FIG. 7c, the angled shape is horizontal extending across a lateral surface of the numeric key pad 100. That is, the wave shape exhibits one peak and two valleys. The two valleys exist on the first and third columns, where the first column is the leftmost. The peak exists between the two valleys in the second column. For example, the key 151 is a key in the first column and thus exhibits a peak of the angled shape. The key 152 is a key in the second column and thus exhibits a valley of the angled shape. The key 153 is a key in the third column and thus exhibits a peak of the angled shape. Those skilled in the art will recognize that the angled shape of the cross sectional view 150 is a horizontal reflection of the angled shape of the cross sectional view 145. Thus, the angled shape maintains a first value for slope toward a peak (i.e., away from valley) and a second value for slope toward a valley (i.e., away from peak). Accordingly, as discussed above, the use of the identical absolute value slope is only exemplary and the slopes of the slants may alter. Furthermore, it should again be noted that this angled shape may exist on a single row or may exist in multiple rows for the data input arrangement 500.

It should be noted that the exemplary embodiments shown in FIGS. 7a-c is only exemplary and the angled shape of the numeric key pad 100 may be altered in a plurality of embodiments. The plurality of embodiments may include, for example, the variety of changes shown in FIGS. 3-6 except applied to an angled shape rather than a wave shape. Those skilled in the art will understand that the alternate embodiments for the wave shape may be achieved for the angled shape as well. Furthermore, it should be noted that the wave shape may also incorporate the angled shape. That is, the data input arrangement 500 may include both a wave shape and an angled shape.

The shaped interface including a wave shape or angled shape offers several advantages over conventional shapes for key pads. For example, one advantage is a blind identification of a key using tactile means. With reference to FIG. 1, when a user feels a key in the first exemplary embodiment, the convex shape (e.g., keys 105, 115) would identify that the key is in the first or third column while a concave shape (e.g., key 110) would identify the key is in the second column. Therefore, a user is able to identify, at the very least, a relative, lateral location on the numeric key pad 100 of the first exemplary embodiment. As discussed above, the numeric key pad 100 may also exhibit the varying amplitude of the wave shape across the columns, as illustrated in the second exemplary embodiment 120 of FIG. 3. Such a variation may also help with blind identification of the keys. Therefore, a user is able to identify, at the very least, a relative, longitudinal and lateral location on the numeric key pad 100 of the second exemplary embodiment. Furthermore, the numeric key pad 100 may also incorporate indicia such as the small, circular protrusion found in conventional numeric key pads. It should be noted that whether or not the indicia exists, a user is able to blindly identify the keys of the data input arrangement 500 with the shaped interface using a naked hand or a protected (e.g., gloved) hand. Furthermore, the angled shape may increase the user's awareness of location due to the prominent tips as opposed to a rounded surface. It should be noted that the blind identification of keys applies to all the embodiments described above (e.g., wave shape, angled shape).

Another advantage is that the shaped interface of the numeric key pad 100 allows for placement of a user's finger. Conventional key pads are designed to allow a user to easily depress the keys so that a user is not required to forcibly push keys to input data. However, this design includes disadvantages such as a user inadvertently pressing keys while simply resting a finger on the conventional key pad. Most conventional key pads also include keys that are small and thus have a small surface area for a finger to rest. Convex keys or flat keys have even smaller surface areas than concave keys. Furthermore, a user's finger is likely to be too large to rest on a single key. That is, the user's finger is likely to rest on several keys at a single time. The shaped interface of the numeric key pad 100 addresses these issues and minimizes the inadvertent pressing of keys. That is, the shaped interface of the numeric key pad 100 is contoured so a user's finger may easily rest. As discussed above with reference to FIG. 1, the wave shape spans across the columns and a trough exists going down the second column. The wave shape increases the potential surface area to which the finger may rest. The crests provide support for the user's finger toward the periphery while the trough provides support for the user's finger toward the middle. Thus, a user may easily rest a finger laterally (across a row), longitudinally (across the trough), diagonally, etc. on the numeric key pad 100 while minimizing inadvertent pressing of keys. The angled shape also provides a similar surface. For example, the valleys that are created increase the potential surface area to which the finger may rest.

It should be noted that the above described advantages are only exemplary and that other advantages exist for the shaped interface of the numeric key pad 100. For example, the keys may include functionality to input several different kinds of data with a single push of a key. The application of the shaped interface of the data input arrangement 500 is only exemplary and the shaped interface may be exhibited on other objects that require the advantages of a shaped surface in contrast to a flat surface.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A data input arrangement of a computing device, comprising:
    a first row of input keys defining a first wave shape extending across a first typing surface thereof, a shape of a first input key in the first row of input keys being convex, a shape of an adjacent second input key in the first row of input keys being concave, and a shape of an adjacent third input key in the first row of input keys being convex; and
    a second row of input keys defining a second wave shape extending across a second typing surface thereof, a shape of a first input key in the second row of input keys being convex, a shape of an adjacent second input key in the second row of input keys being concave, and a shape of an adjacent third input key in the first row of input keys being convex,
    the first and second rows being contiguous with one another so that the first and second wave shapes create a non-linear surface extending across the data input arrangement, the non-linear surface enabling users to tactilely locate individual keys of the first and second rows, wherein a surface underlying the first and second rows is a substantially linear surface.

2. The data input arrangement of claim 1, further comprising:
    a third row of input key defining a third wave shape extending across a third typing surface thereof,
    the second and third rows being contiguous with one another so that the third row lengthens the non-linear surface across the data input arrangement.

3. The data input arrangement of claim 1, wherein an amplitude of at least one wave shape of the non-linear surface is one of maintained, increasing, decreasing, and a combination thereof.

4. The data input arrangement of claim 1, wherein the at least one wave shape of the non-linear surface includes one of a full period, two full periods, a half period, and a combination thereof.

5. The data input arrangement of claim 1, wherein indicia is included on at least one input key of the first and second rows.

6. The data input arrangement of claim 1, further comprising a contoured area to rest an object adjacent to the non-linear surface.

7. The data input arrangement of claim 1, wherein the first and second rows have different wave shapes.

8. A system, comprising:
    a housing;
    a data input arrangement at least partially disposed within at least a portion of the housing, the data input arrangement including a plurality of rows of input keys that define a wave shape extending across each row of the data input arrangement, a shape of a first input key in a first of the plurality of rows being convex, a shape of an adjacent second input key in the first of the plurality of rows being concave, and a shape of an adjacent third input key in the first of the plurality of rows of input keys being convex, the plurality of rows being contiguous with one another so that the wave shapes create a non-linear surface extending across the data input arrangement, the non-linear surface enabling users to tactilely locate individual input keys of the data input arrangement, wherein a surface underlying the plurality of input keys is a substantially linear surface; and
    a data acquisition device selected from the group consisting of an imaging scanner, a laser scanner, a radio frequency identification reader, and a barcode reader.

9. The system of claim 8, wherein the first, second, and third input keys are arranged in at least one row defining a portion of the non-linear surface.

10. The system of claim 8, wherein an amplitude of at least one wave shape of the non-linear surface is one of maintained, increasing, decreasing, and a combination thereof.

11. The system of claim 8, wherein at least one wave shape of the non-linear surface includes one of a full period, two full periods, a half period, and a combination thereof.

12. The system of claim 8, wherein indicia is included on at least one of the first, second, and third input keys.

13. The system of claim 8, further comprising a contoured area to rest an object adjacent to the non-linear surface.

14. The system of claim 8, wherein the non-linear surface comprises a plurality of different wave shapes.

* * * * *